3,755,384
TRIALKYLSILYL ETHERS OF 17α-ALKYNYL-ESTRA - 1,3,5(10) - TRIENE-3,17β-DIOLS AND 11β-ALKYL DERIVATIVES THEREOF

Edward A. Brown, Wilmette, and Ivar Laos, Skokie, Ill., assignors to G. D. Searle & Co., Chicago, Ill.
No Drawing. Filed Apr. 7, 1971, Ser. No. 132,152
Int. Cl. C07c *169/08*
U.S. Cl. 260—397.5                 6 Claims

---

ABSTRACT OF THE DISCLOSURE

The reaction of 17α-alkynylestra-1,3,5(10)-triene-3,17β-diols, optionally alkyated at te 11-position, with a trialkylsilyl chloride affords the corresponding trialkylsilyl ethers, which are useful pharmacological agents as evidenced by their potent and long-acting estrogenic and anti-fertility properties.

---

The present invention is concerned with steroidal silyl ethers and, more particularly, with trialkylsilyl ethers of 17α-alkynylestra-1,3,5(10)-triene-3,17β-diols and the 11β-alkyl derivatives thereof. These compounds are represented by the following structural formula

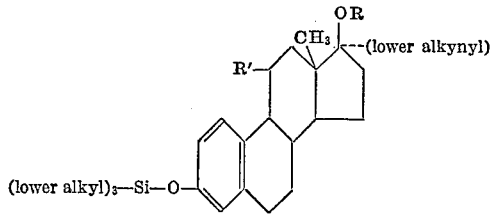

wherein R can be either hydrogen or a tri-(lower alkyl) silyl group and R' denotes hydrogen or an alkyl radical containing less than four carbon atoms.

The lower alkyl radicals encompassed in the foregoing structural formula are typified by methyl, ethyl, propyl, butyl, pentyl, hexyl, heptyl, and the branched-chain isomers thereof.

Representative of the lower alkynyl groups, denoted in that formula are ethynyl, propynyl, butynyl, pentynyl, hexynyl, heptynyl and the branched-chain radicals isomeric therewith.

The compounds of the present invention are conveniently manufactured by contacting a 3,17β-diol of the following structural formula

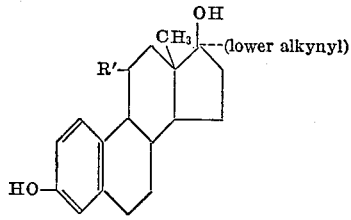

wherein R' is hydrogen or an alkyl radical containing less than four carbon atoms with a tri-(lower alkyl)silyl chloride, preferably in the presence of an acid acceptor such as pyridine. 17α-ethynyl-11β-methylestra-1,3,5(10)-triene-3,17β-diol, for example, is dissolved in pyridine and contacted with (tertiary-butyl)dimethylsilyl chloride, thus affording 17α-ethynyl-17β-hydroxy-11β-methylestra-1,3,5(10)-trien-3-yloxy-(tertiary-butyl)dimethylsilane.

The bis-silyl ethers of this invention can be produced by further reaction of the aforementioned 3-mono-silyl ethers with a tri-(lower alkyl)silyl chloride in the presence of the corresponding hexaalkyldisilazane. 17α-ethynylestra-1,3,5(10)-triene - 3,17β - diol thus is contacted with (tertiary-butyl)dimethylsilyl chloride in pyridine to afford 17α-ethynyl - 17β - hydroxyestra-1,3,5(10)-trien-3-yloxy-(tertiary-butyl)dimethylsilane and the latter derivative is allowed to react with trimethylsilyl chloride and pyridine in the presence of hexamethyldisilazane to produce 17α-ethynyl - 17β - trimethylsilyloxyestra-1,3,5(10)-trien-3-yloxy-(tertiary-butyl)dimethylsilane.

An alternate procedure for production of the instant bis-silyl ethers, wherein the silyl groups at positions 3 and 17 are identical, consists of contacting the aforementioned 3,17β-diol starting materials with a tri-(lower alkyl)silyl chloride in the presence of the corresponding hexaalkyldisilazane. 17α-ethynyl-11β-methyl-17β-trimethylsilyloxyestra - 1,3,5(10) - trien-3-yloxytrimethylsilane is thus produced when 17α-ethynyl-11β-methylestra-1,3,5(10)-triene-3,17β-diol is contacted with trimethylsilyl chloride and pyridine in the presence of hexamethyldisilazane.

The compounds of the present invention display valuable pharmacological activity as evidenced by their potent estrogenic and anti-fertility properties. They are particularly advantageous in view of their prolonged action.

The prolonged estrogenic action of these compounds is determined by a method adapted from that originally described by Allen and Doisy, J. Am. Med. Assoc., 81, 819 (1923). Details of that assay are as follows:

Female rats, 60 days of age, are spayed and allowed to recover for a period of 20–30 days. At 89–90 days of age the rats are primed with two equal injections of 2.5 mcg. of estrone and 0.1 ml. of corn oil, spaced 24 hours apart. The vaginal mucosa is examined 56 and 72 hours after the first injection, and those animals responding positively to two courses of priming are selected for testing purposes. Each test animal is treated with a selected dose of the test compound administered in two equal portions given 24 hours apart. Fresh smears are taken from the vaginal mucosa three times per week with 2–3 days between smears and are examined microscopically for the presence of cornified and/or round nucleated epithelial cells. Using that criterion, each smear is scored as positive or negative. A test substance is considered active if positive responses are obtained in more than 10% of the animals. In order to determine the duration of activity, fresh smears are taken until positive responses are no longer observed in more than 10% of the animals.

The anti-fertility property of the compounds of this invention is detected by the following assay:

A group of young adult Charles River female rats is treated with a single dose of the test compound dissolved in corn oil, at which time a control group is treated with corn oil alone. On the day of treatment, each of the treated and control animals is placed together with a male, then is observed until evidence of pregnancy occurs. At that time, the pregnant rat is isolated from the male and is observed until such time as littering occurs. A compound is rated active if the time until littering is significantly increased.

The instant novel compounds are useful also as chemosterilants for the control of nuisance animal populations. Thus, these compounds provide a means for limiting the population of animals which are regarded as pests in various geographic areas of the world. Such nuisance animals, particularly when occurring in large numbers, can present severe economic and health hazards by damaging agricultural crops and trees, household articles and food stuffs; by killing livestock or desirable wild animals and birds; by competing with more desirable animals for food; by destruction resulting from their burrowing and gnawing; or by transmitting diseases to man and animals. These nuisance animals include opossums of the family di-Delphidae, order Marsupialia; fruit-eating bats and true vampire bats of the order Chiroptera; rabbits and hares of the order Lagamorpha; members of the order Carnivora such as coyotes, blackbacked jackals, foxes, wolves, tayras, grisons, honey badgers, American badgers, mongooses and pumas; certain species of ungulates of the family Suidae; and, most particularly, mammals of the order Rodentia, for example ground and tree squirrels, marmots, prairie dogs, pocket gophers, tuzas and taltuzas, rice rats, highland desert mice, marsh rats, cotton rats, common hamsters, true lemmings, muskrats, gerbils, mole rats, garden dormice, tree dormice, spinydormice, porcupines, cavies, guinea pigs, nutrias, cane rats, blesmols, sand rats, members of the genus microtus such as meadow mice, and rodents of the family Muridae such as those of the genera Apodemus Millardia, Rattus (especially black rats and Norway rats), Mus (e.g. common house mice), Bandicota and Nesokia.

Representative of the chemosterilant activity of the novel compounds of this invention is their inhibition of the secretion of the pituitary gonadotrophins and consequent inhibition of ovulation and conception in nuisance animals such as rats. Furthermore, these compounds have been found to prevent implantation in newly mated rodents. In addition, fed to rats near the time of parturition, these compounds are excreted in the milk in sufficient quantities to sterilize the nursing female offspring. Such female rodents, when mature, exhibit nearly constant estrus but do not ovulate. Furthermore, because wild rodents as well as other nuisance animals, cannot be expected to return with regularity to a single food source, a particularly important advantage of the instant compounds is their long duration of activity upon oral administration. Because of these facts, the compounds of this invention may be used as population control agents for nuisance animals, conveniently by placing them in a bait. The bait comprises one of the compounds of the instant invention and an edible carrier. The term "edible carrier" signifies all non-toxic substances consumable or ingestable by animals in solid, liquid or other suitable form. The edible carrier can thus, for example, consist of one or more of the following: foods, food additives (e.g. sweeting or flavoring agents), aerosol propellants, fillers, binders, common organic and inorganic solids. When the carrier is a liquid, the bait can be in the form of a solution, suspension, syrup or emulsion. The active ingredient, i.e. one of the compounds of this invention, and the carrier are mixed in a known manner and the bait so prepared is distributed in an area frequented by nuisance animals. Obviously, the bait can itself represent a substitute or supplemental food or drinking supply for the animals or it can be in a form which is to be applied for example by spraying or injection to the crops, trees or articles which the nuisance animals consume or ingest.

For rodents, the edible carrier is preferably a food which rodents find to be highly palatable such as cereal grains, cracked corn, corn meal, bread crumbs, meat or fish scraps, oils such as vegetable or fish oils, powdered sugar, molasses, salt and spices and various mixtures thereof. The bait so prepared is distributed in an area frequented by rodents. For greatest effect on total population it is desirable to administer the material at about the time of parturition so that the female will be sterilized. Thus, single distributions of bait at repeated intervals of 6 weeks are preferred for many rodent species. Obviously, the time intervals will vary according to the reproductive cycle of the particular nuisance animal involved. It is apparent that the concentration of active ingredient can vary considerably depending upon the particular nuisance animal concerned and the specific edible carrier used.

The invention will appear more fully from the examples which follow. These examples are given by way of illustration only and are not to be construed as limiting the invention either in spirit or in scope as many modifications both in materials and methods will be apparent from this disclosure to those skilled in the art. In these examples, temperatures are given in degrees centigrade (° C.) and quantities of materials in parts by weight unless otherwise noted.

EXAMPLE 1

To a solution of 17α-ethynylestra-1,3,5(10)-triene-3, 17β-diol in 5 parts of pyridine is added 1 part of (tertiary-butyl)dimethylsilyl chloride. After standing at a temperature of about 35° for approximately 18 hours, the precipitated pyridine hydrochloride is removed by filtration and the filtrate is poured into approximately 100 parts of a mixture of ice and water. Extraction of that aqueous mixture with hexane affords an organic solution, which is washed with water, then dried over anhydrous sodium sulfate. Distillation of the solvent under reduced pressure affords a residue which crystallizes upon standing. Recrystallization of that crude product from hexane yields 17α-ethynyl-17β-hydroxyestra-1,3,5(10)-trien - 3 - yloxy-(tertiary-butyl)dimethylsilane melting at about 120°. This compound is represented by the following structural formula

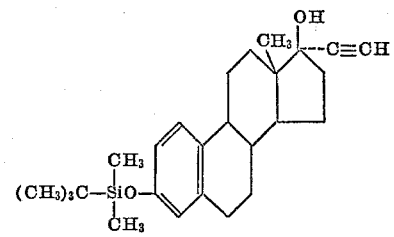

EXAMPLE 2

When an equivalent quantity of 17α-butynylestra-1,3,5 (10)-triene-3,17β-diol is substituted in the procedure of Example 1, there is produced 17α-butynyl-17β-hydroxyestra - 1,3,5(10) - trien - 3 - yloxy-(tertiary-butyl)dimethylsilane.

EXAMPLE 3

The substitution of an equivalent quantity of ethylmethylpropylsilyl chloride in the procedure of Example 1 results in 17α-ethynyl-17β-hydroxyestra-1,3,5(10)-trien-3-yloxyethylmethylpropyl silane.

EXAMPLE 4

To a solution of 1.05 parts of 17α-ethynyl-11β-methylestra - 1,3,5(10) - triene - 3,17β-diol in 5 parts of pyridine is added 1 part of (tertiary-butyl)dimethylsilyl chloride and that reaction mixture is stored at 30–35° for about 16 hours. The crude product is precipitated by pouring into a mixture of ice and water, then is isolated by filtration. Further purification is effected by dissolution in a 3:1 mixture of hexane and benzene, followed by washing of that organic solution with water, drying over anhydrous sodium sulfate and removal of the solvent by distillation under reduced pressure. The residual oily product is chromatographed on a neutral silica column and the 80% benzene-20% hexane eluates are combined and distilled to dryness. The product thus obtained is recrystallized from hexane to afford 17α-ethynyl-17β-hydroxy-11β-methylestra - 1,3,5(10) - trien - 3 - yloxy-(tertiary-butyl) dimethylsilane melting at about 120–122°, and further represented by the following structural formula

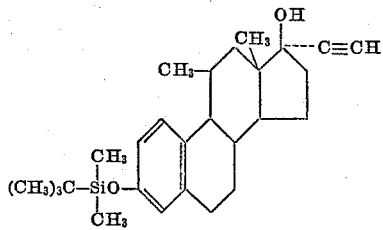

EXAMPLE 5

By substituting an equivalent quantity of 11β-methyl-17α - propynylestra - 1,3,5(10) - triene-3,17β-diol and otherwise proceeding according to the processes described in Example 4, there is obtained 17β-hydroxy-11β-methyl-17α - propynylestra - 1,3,5(10) - trien-3-yloxy-(tertiary-butyl)dimethylsilane.

EXAMPLE 6

The reaction of 11β - methyl-17α-propynylestra-1,3,5-(10 - triene - 3,17β - diol with ethylmethylpropylsilyl chloride according to the procedure described in Example 4 results in 17β-hydroxy-11β-methyl-17α-propynylestra-1,3,5(10) - trien - 3 - yloxyethylmethylpropylsilane.

EXAMPLE 7

A mixture containing 0.8 part of 17α-ethynyl-17β-hydroxyestra - 1,3,5(10) - trien - 3 - yloxy - (tertiary-butyl) dimethylsilane, 5 parts by volume of trimethylsilyl chloride, 80 parts of pyridine and 8 parts by volume of hexamethyldisilazane is kept at room temperature for about 2¾ hours, then is poured carefully into approximately 500 parts of an ice-water mixture. The resulting precipitate is collected by filtration, then washed with water and dried to afford 17α-ethynyl-17β-trimethylsilyloxyestra-1,3,5(10) - trien - 3 - yloxy - (tertiary-butyl)dimethylsilane. This compound exhibits infrared maxima, in chloroform, at about 1492, 1568, 1607 and 3310 reciprocal centimeters and also nuclear magnetic resonance peaks in deuterochloroform at about 10, 49, 58 and 153 cycles per second, using a 60 megahertz instrument. It is represented by the following structural formula

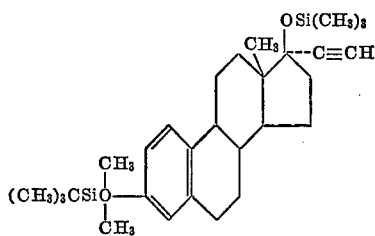

EXAMPLE 8

The substitution of an equivalent quantity of 17α-butynyl - 17β - hydroxyestra - 1,3,5(10) - trien - 3-yloxy-(tertiary-butyl)dimethylsilane in the procedure of Example 7 results in 17α-butynyl-17β-trimethylsilyloxyestra-1,3,5(10) - trien - 3 - yloxy-(tertiary-butyl)dimethylsilane.

EXAMPLE 9

When an equivalent quantity of 17α-ethynyl-17β-hydroxyestra - 1,3,5(10) - trien - 3 - yloxyethylmethylpropylsilane is substituted in the procedure of Example 7, there is produced 17α-ethynyl-17β-trimethylsilyloxyestra-1,3,5(10)-trien-3-yloxyethylmethylpropylsilane.

EXAMPLE 10

When equivalent quantities of ethylmethylpropylsilyl chloride and 1,3 - diethyl - 1,3-dimethyl-1,3-dipropyldisilazane substituted in the procedure of Example 7, there is obtained 17α - ethynyl - 17β - ethylmethylpropylsilyloxyestra - 1,3,5(10) - trien - 3 - yloxy - (tertiary-butyl) dimethylsilane.

EXAMPLE 11

A mixture containing 10 parts of 3,11β-dihydroxyestra-1,3,5(10) - trien - 17 - one 17-ethylene ketal, 112 parts of ethanol, 4.22 parts of benzyl chloride and 8.5 parts of anhydrous potassium carbonate is heated at the reflux temperature for about 25 hours, then is cooled and filtered. The resulting filtrate is concentrated to dryness under reduced pressure and the residual oily crude product is triturated with ether to afford crystals of 3-benzyloxy - 11β - hydroxyestra - 1,3,5(10) - trien - 17 - one 17-ethylene ketal.

To a solution of 1.62 parts of 3-benzyloxy-11β-hydroxy-estra - 1,3,5(10) · trien - 17 - one 17-ethylene ketal in 100 parts of acetone is added, at 5–10° over a period of about 2 minutes with vigorous stirring, 1.3 parts of an aqueous solution, 8 N in chromium trioxide and 8 N in sulfuric acid. The excess reagent is destroyed by the addition of a small quantity of isopropyl alcohol and the resulting mixture is filtered through diatomaceous earth, then stirred with approximately 100 parts by volume of saturated sodium bicarbonate. The organic solvent is removed by distillation under reduced pressure and the residual mixture is extracted thoroughly with chloroform. The chloroform extracts are combined, dried over anhydrous magnesium sulfate and concentrated to dryness, thus producing 3-benzyloxyestra-1,3,5(10)-triene-11,17-dione 17-ethylene-ketal.

To a solution of 16.8 parts of 3-benzyloxyestra-1,3,5-(10)-triene-11,17-dione 17-ethylene ketal in 1232 parts of dry benzene, under a nitrogen atmosphere, is added dropwise with stirring 60 parts by volume of 3 M ethereal ethyl magnesium bromide. The reaction mixture is kept slightly below room temperature during addition of the reagent. Stirring is continued for about 20 minutes, at the end of which time the mixture is cooled and 6.2 parts of methanol is added in order to decompose the Grignard adduct. This reaction sequence is then repeated by adding a fresh 110 part by volume portion of ethereal 3 M ethyl magnesium bromide. Stirring at room temperature is continued for about 30 minutes, at the end of which time 10.8 parts of methanol is added. A third addition of Grignard reagent, this time 200 parts by volume of 3 M ethyl magnesium bromide, is carried out and after stirring for one hour, the mixture is diluted with ether and sufficient saturated aqueous ammonium chloride is added to completely precipitate the magnesium salts. The organic layer is decanted from the gummy precipitate and is dried over anhydrous magnesium sulfate, then distilled to dryness under reduced pressure. Purification of the crude product is effected by chromatography on neutral silica followed by elution with benzene-ethyl acetate solutions. The 5% ethyl acetate in benzene eluate is distilled to dryness under reduced pressure, thus affording 3-benzyloxy-11β-ethyl-11α-hydroxyestra-1,3,5(10)-trien - 17 - one 17-ethylene ketal.

A mixture containing 4.87 parts of 3-benzyloxy-11β-ethyl-11α-hydroxyestra-1,3,5(10)-trien-17-one 17 - ethylene ketal, 24 parts of concentrated hydrochloric acid and 150 parts of ethanol is heated at the reflux temperature under nitrogen for about 2½ hours. The solvent is removed by distillation under reduced pressure and the residual gummy product is extracted into benzene. The benzene extract is washed successively with aqueous sodium bicarbonate and water, then dried over anhydrous sodium sulfate. Removal of the solvent by distillation under reduced pressure affords 3-benzyloxy-11-ethylestra-1,3,5(10),9(11)-tetraen-17-one, characterized by an infrared absorption peak, in chloroform, at about 5.74 microns.

A mixture containing 1.5 parts of 3-benzyloxy-11-ethylestra - 1,3,5(10),9(11) - tetraen - 17 - one in 96 parts of methanol and 0.15 part of 10% palladium-on-carbon catalyst is shaken with hydrogene at room temperature and atmospheric pressure until two molecular equivalents of hydrogen have been absorbed. The catalyst is then removed by filtration and the solvent by distillation under reduced pressure. The residual gummy product is purified by chromatography on a neutral silica column and is eluted with ethyl acetate-benzene mixtures. The 1% ethyl acetate in benzene eluate is distilled to dryness under reduced pressure and the resulting crude residue is purified by recrystallization from acetone to afford 3-hydroxy-11β - ethylestra - 1,3,5(10)-trien-17-one, melting at about 269–271°.

A mixture of 4 parts of 11β-ethyl-3-hydroxyestra-1,3,5-(10)-trien-17-one, 10 parts of 30% lithium acetylide-70% ethylenediamine complex and 225 parts of tetrahydrofuran is stirred in an acetylene atmosphere at 0.5° for about 2½ hours, then is diluted carefully with water. The resulting solution is concentrated to a small volume under nitrogen and the residual mixture is extracted with benzene. The benzene layer is dried over anhydrous magnesium sulfate, then is distilled to dryness under reduced pressure. Trituration of the resulting residue with ether and hexane followed by recrystallization from acetone-hexane affords 17α-ethynyl-11β-ethyl - 3 - hydroxyestra-1,3,5(10)-trien-17β-ol.

By substituting an equivalent quantity of 11β-ethyl-17α-ethynylestra-1,3,5(10)-triene-3,17β-diol and otherwise proceeding according to the processes described in Example 4, there is obtained 11β-ethyl-17α-ethynyl - 17β-hydroxyestra-1,3,5(10) - trien - 3 - yloxy-(tertiary-butyl) dimethylsilane, characterized by the following structural formula

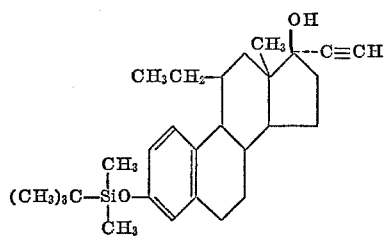

EXAMPLE 12

A mixture consisting of 5 parts of 3,17β-dihydroxy-estra-1,3,5(10)-trien-11-one, 2,4 parts of benzyl chloride, 4.8 parts of potassium carbonate and 144 parts of ethanol is heated at the reflux temperature for about 24 hours, hours, then is stripped of solvent by distillation under reduced pressure. The resulting residue is extracted into benzene and the benzene extract is washed with water under reduced pressure affords the crude product, which until neutral. Removeal of the benzene by distillation is purified by recrystallization from methanol, thus affording 3-benzyloxy-17β - hydroxyestra - 1,3,5(10) - trien-11-one, melting at about 159–160°.

The reaction of equivalent quantities of 3-benzyloxy-17β-hydroxyestra-1,3,5(10)-trien-11-one and allyl magnesium bromide according to the procedure described in Example 11 results in 3-benzyloxy - 11 - allylestra-1,3,5-(10)triene-11,17β-diol, characterized by infrared absorption maxima, in chloroform, at about 2.76, 2.80, 6.04 and 6.11 microns. In deuterochloroform this compound exhibits nuclear magnetic resonance peaks at about 55, 210–240, 303, 312 and 443 cycles per second using a 60 megahertz instrument.

A mixture containing 4 parts of 11-allyl-3-benzyloxy-estra-1,3,5(10)-triene-11,17β-diol and 60 parts by volume of formic acid is heated at steam bath temperature for about 1 hour, at the end of which time approximately 100 parts of water is added. The resulting mixture is filtered and the filtrate is extracted with ether. The ether extract is washed with aqueous sodium bicarbonate until neutral, then dried over anhydrous sodium sulfate and concentrated to dryness under reduced pressure to afford 11-allyl-3 - benzyloxyestra - 1,3,5(10),9(11) - tetraen-17β-ol 17-formate.

A mixture containing 0.6 part of 11-allyl-3β-benzyl-oxyestra-1,3,5(10),9(11)-tetraen-17β-ol 17-formate and 1 part by volume of 6% aqueous potassium hydroxide is stirred at room temperature for about 10 minutes, then is concentrated to dryness under reduced pressure. The resulting residue is exacted with ether and the ether extract is dried over anhydrous sodium sulfate, then concentrated to dryness under reduced pressure, thus affording 11-allylestra-1,3,5(10),9(11)-tetraene - 3,17β - diol 3-benzyl ether.

When an equivalent quantity of 11-allylestra-1,3,5(10), 9(11)-tetraene-3,17β-diol 3-benzyl ether is oxidized with chromium trioxide according to the procedure of Example 11, there is produced 11-allyl-3-hydroxyestra-1,3,5-(10),9(11)-tetraen-17-one 3-benzyl ether.

A mixture containing 0.6 part of 11-allyl-3-hydroxy-estra-1,3,5(10),9(11)-tetraen-17-one 3-benzyl ether, 90 parts of isopropyl alcohol and 0.3 part of 10% palladium-on-carbon catalyst is stirred in a hydrogen atmosphere at about 60 pounds per square inch pressure and at a temperature of about 60° for approximately 48 hours, at the end of which time the mixture is cooled and filtered to remove the catalyst. The resulting filtrate is concentrated to dryness to afford 3-hydroxy-11β-propylestra-1,3,5(10)-trien - 17 - one, characterized by ultraviolet absorption maxima at about 278 and 286 millimicrons.

Ethynylation of an equivalent quantity of 3-hydroxy-11β-propylestra-1,3,5(10)-trien-17-one according to the procedure described in Example 11 results in 17α-ethynyl-11β-propylestra-1,3,5(10)-triene-3,17β-diol.

When an equivalent quantity of 17α-ethynyl-11β-propylestra-1,3,5(10)-triene-3,17β-diol is substituted in the procedure described in Example 4, there is produced 17α-ethynyl - 17β - hydroxy-11β-propylestra-1,3,5(10)-trien-3-yloxy-(tertiary-butyl)dimethylsilane.

What is claimed is:

1. A compound of the formula

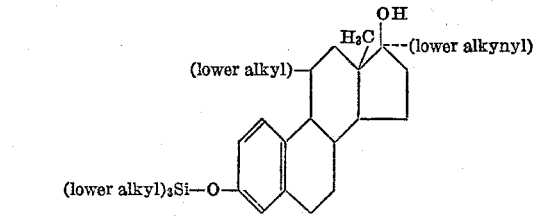

2. As in claim 1, a compound of the formula

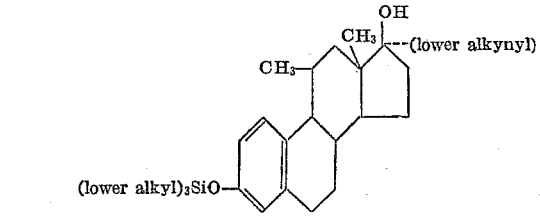

3. As in claim 1, a compound of the formula

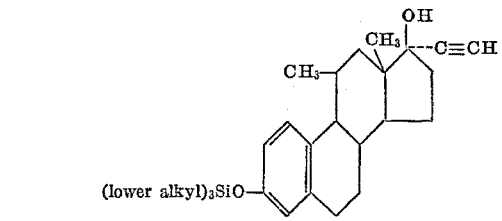

4. As in claim 1, the compound which is 17α-ethynyl-17β - hydroxy - 11β-methylestra-1,3,5(10)-trien-3-yloxy-(tertiary-butyl)dimethylsilane.

5. As in claim 1, the compound which is 11β-ethyl-17α-ethynyl - 17β-hydroxyestra-1,3,5(10)-trien-3-yloxy-(tertiary-butyl)dimethylsilane.

6. As in claim 1, the compound which is 17α-ethynyl-17β-hydroxy-11β-propylestra-1,3,5(10)-trien-3-yloxy-(tertiary-butyl)dimethylsilane.

References Cited
UNITED STATES PATENTS 3,299,108  1/1967  Baran _____ 260—397.5
3,671,555  6/1972  Teichmuller et al. __ 260—397.4

HENRY A. FRENCH, Primary Examiner

U.S. Cl. X.R.

260—999

UNITED STATES PATENT OFFICE
CERTIFICATE OF CORRECTION

Patent No. 3,755,384    Dated August 28, 1973

Inventor(s) Edward A. Brown and Ivar Laos

It is certified that error appears in the above-identified patent and that said Letters Patent are hereby corrected as shown below:

Column 1, line 14, "te" should be -- the --.

Column 5, line 7, "(10-" should be -- (10)- --.

Column 6, line 61, "hydrogene" should be -- hydrogen --.

Column 7, line 31, "2,4" should be -- 2.4 --.

Column 7, line 33, delete "hours,".

Column 7, lines 36-37, "water under" should be -- water until neutral. Removal of the benzene by distillation under --.

Column 7, line 38, delete "until neutral. Removel of the benzene by distillation".

Column 7, line 68, "extacted" should be -- extracted --.

Signed and sealed this 16th day of April 1974.

(SEAL)
Attest:

EDWARD M. FLETCHER, JR.
Attesting Officer

C. MARSHALL DANN
Commissioner of Patents